No. 642,930. Patented Feb. 6, 1900.
C. E. SHARPLESS.
CAR BRAKE.
(Application filed May 19, 1899.)
(No Model.) 3 Sheets—Sheet 1.
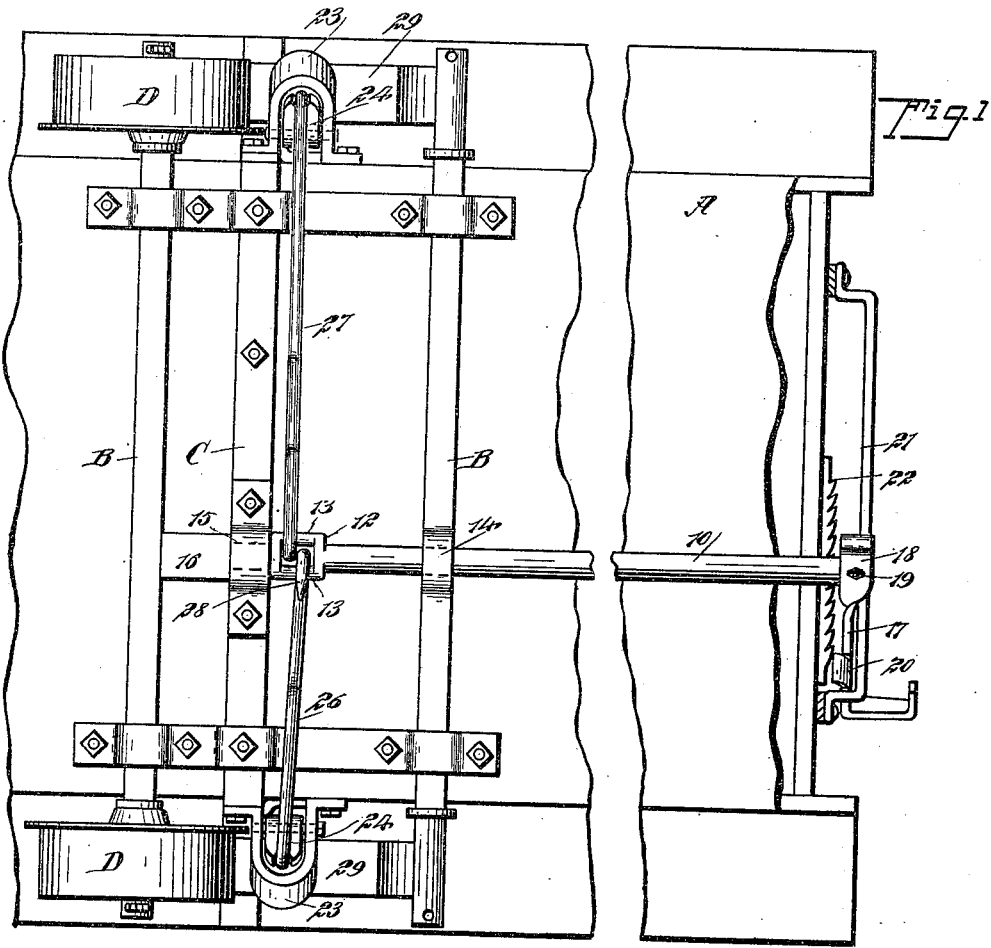
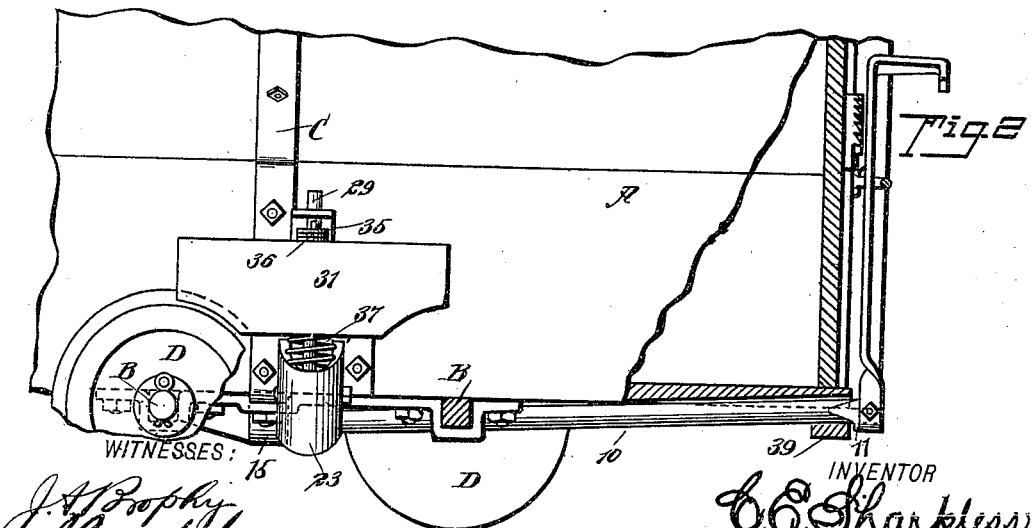
WITNESSES:
INVENTOR
C. E. Sharpless
BY
ATTORNEYS
THE NORRIS PETERS CO., PHOTO-LITHO., WASHINGTON, D. C.

No. 642,930. Patented Feb. 6, 1900.
C. E. SHARPLESS.
CAR BRAKE.
(Application filed May 19, 1899.)
(No Model.) 3 Sheets—Sheet 2.

WITNESSES:
INVENTOR
C. E. Sharpless
BY
ATTORNEYS

THE NORRIS PETERS CO., PHOTO-LITHO., WASHINGTON, D. C.

No. 642,930. Patented Feb. 6, 1900.
C. E. SHARPLESS.
CAR BRAKE.
(Application filed May 19, 1899.)

(No Model.) 3 Sheets—Sheet 3.

WITNESSES: INVENTOR
C. E. Sharpless
BY
ATTORNEYS

UNITED STATES PATENT OFFICE.

CHARLES EDWARD SHARPLESS, OF DUBOIS, PENNSYLVANIA.

CAR-BRAKE.

SPECIFICATION forming part of Letters Patent No. 642,930, dated February 6, 1900.

Application filed May 19, 1899. Serial No. 717,459. (No model.)

*To all whom it may concern:*

Be it known that I, CHARLES EDWARD SHARPLESS, of Dubois, in the county of Clearfield and State of Pennsylvania, have invented a new and Improved Car-Brake, of which the following is a full, clear, and exact description.

One object of the invention is to provide a brake particularly adapted for use upon mine-cars, but applicable to other vehicles, and which is compact, comprising but a small number of parts and having extremely-few wearing-surfaces, and wherein the various parts are located where they are the least liable to injury.

Another object of the invention is to provide a brake that is capable of self-adjustment or compensation for any unequal wear on the brake shoes or blocks, thus obtaining equal pressure of the shoes or blocks at both sides of the car.

Another object of the invention is to so construct the improved brake mechanism that there will be an entire absence of friction between the brake-blocks and car-wheels when the brake is not in use and whereby great pressure may be applied to the brake-blocks though but little power be applied to the operating-lever of the mechanism.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 3:
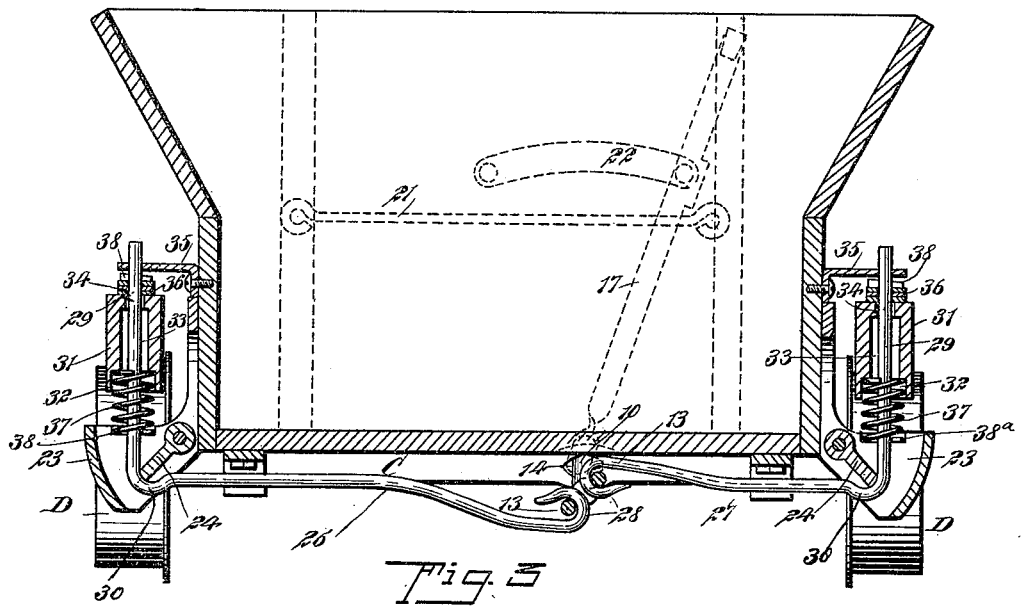
Figure 4:
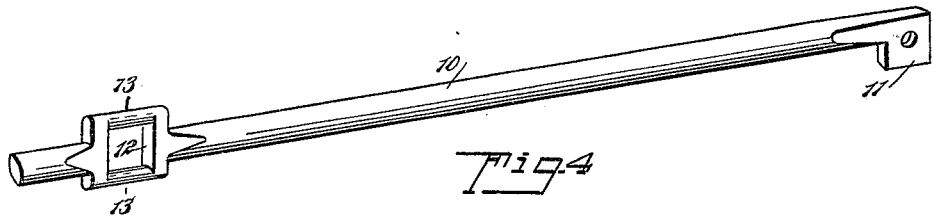
Figure 5:
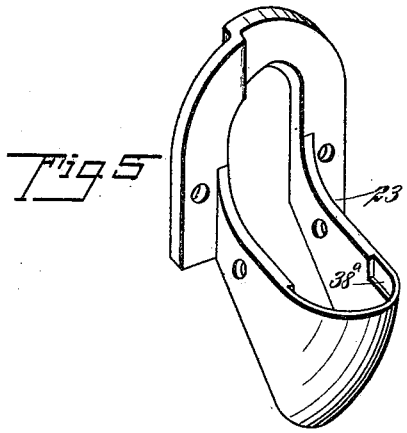
Figure 7:
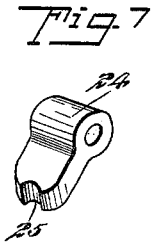
Figure 8:
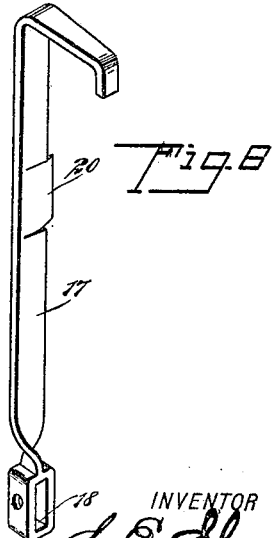
Figure 8:
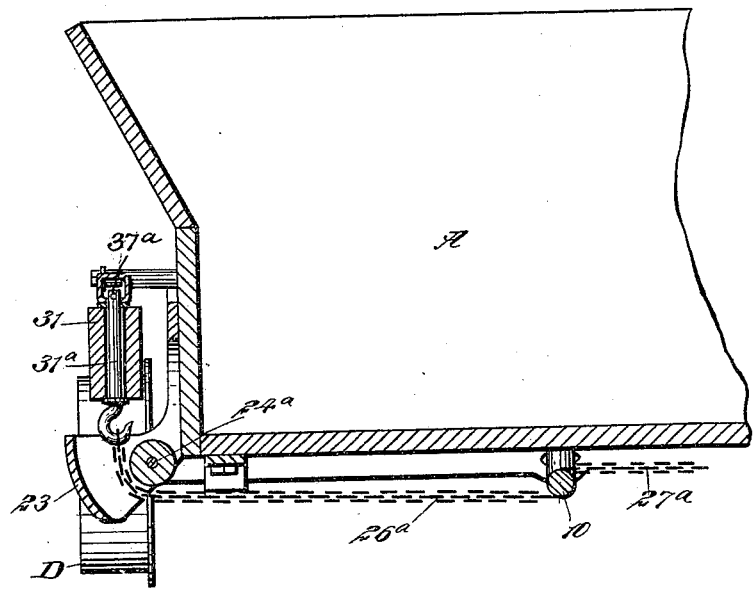

Figure 1 is a bottom plan view of a portion of a car having the improved brake applied. Fig. 2 is an elevation of a part of one side of a car, portions of the car-body being broken away. Fig. 3 is a transverse vertical section through the car-body and brake mechanism. Fig. 4 is a detail perspective view of the shifting bar of the brake mechanism. Fig. 5 is a perspective view of a guide or guard used in connection with the brake mechanism. Fig. 6 is a detail perspective view of the shifting lever employed, and Fig. 7 is a detail perspective view of a tongue that is adapted to have movement in the guide or guard shown in Fig. 5. Fig. 8 is a transverse vertical section through a portion of a car-body, illustrating a slightly-modified construction for operating the brake-shoes from the shifting bars.

A represents the body of a car, B the axles, and C a strengthening-strap usually employed and which extends across the bottom of the car between the axles and preferably up along the side surfaces of the car. A shifting bar 10 is longitudinally mounted beneath the car, one end of said shifting bar extending beyond the end of the car, and this projecting end of the shifting rod is provided with a downwardly-extending head 11.

Near the opposite or inner end of the shifting bar a loop 12 is formed, extending beyond opposite sides of said bar, and the sides 13 of said loop constitute crank-pins. The shifting bar 10 is passed through an elongated eye 14 in the axle nearest the end of the car at which the brake is operated and through an elongated bearing 15, fastened on the strap C or to the bottom of the car, and a block 16 extends from the inner axle to the bearing 15, which block serves to prevent any obstructions on the road from striking the inner end of the shifting bar and injuring the mechanism or interfering with the movement thereof. The shifting bar is adapted to have a rocking or rotating movement, and a lever 17 is attached to its head portion, the said lever having a loop 18 arranged to receive said head of the shifting bar, and a pivot-pin 19 is so passed through the said loop 18 and the head of the shifting bar that the handle or upper end of the lever may have a movement to and from the end of the car. The shifting lever 17 is provided with a tooth 20, and the tooth on the shifting lever is adapted to engage with a rack 22, located on the end of the car, and the shifting lever has movement within the guard-rail 21, which extends beyond the ends of the rack 22 and in front thereof.

A guide or guard 23 is secured to each side of the car, between the wheels D thereof. This guide or guard, as shown in Figs. 1 and 3, is of box-like construction, being open at the top and open at the bottom, and when the guides or guards are secured to the sides of the car-body said guides or guards extend over the upper ends of the strap C, if such strap be on the car; but sometimes the strap C is omitted.

A tongue 24 is mounted upon a suitable spindle within each of the guides or guards 23, and each tongue is provided at its outer or free end with a recess 25. Draft-rods 26 and 27 are used in connection with the shifting rod 10, and these draft-rods are provided with hooks 28 at their inner ends, the hooks being passed through the loop 12 in the shifting bar and engaged with the crank-sections 13 thereon. The draft-rods 26 and 27 extend in opposite directions beyond the sides of the car-body, and each draft-rod is provided with a vertical outer section 29. Where the vertical sections 29 unite with the horizontal sections a depression 30 is made in the rods, as is shown best in Fig. 3. A brake shoe or block 31 is carried by the vertical section of each draft-rod 26 and 27, the brake shoes or blocks 31 being adapted to engage with the upper surfaces of the wheels D or to extend downward between the wheels. Each brake shoe or block is provided with a recess 32 in its under face and with a bore made in two diameters 33 and 34, the larger diameter of the bore being adjacent to the recess 32.

The vertical sections 29 of the draft-rods are passed through the bores in the brake shoes or blocks, and the diameter of the larger bore 33 of each brake shoe or block 31 is about twice the diameter of the vertical portions of the draft-rods, which allows the said rods to adjust themselves to any change of position necessary after the blocks have come to rest on the wheels without any unnecessary strain upon said draft-rods. The diameter of the upper and smaller bore in each brake shoe or block is slightly greater than the diameter of the portion of the draft-rod passed through the block or shoe.

The upper ends of the draft-rods 26 and 27 are passed through brackets 35, secured to the sides of the car-body, and washers 36 are located upon the upper portions of the said draft-rods 26 and 27, between the tops of the brake shoes or blocks and the brackets 35, the washers being held in place by suitable keys 38. Springs 37, preferably coil-springs, are loosely mounted on the upper portions of the draft-rods 26 and 27, which springs enter the recesses 32 in the brake shoes or blocks and pockets 38$^a$ in the box guides or guards 23.

If in practice it is found desirable, a strap-spring 37$^a$ may be used in connection with the brake blocks or shoes and be supported in a suitable manner at their ends from the sides of the car, and instead of the draft-rods 26 and 27 chains may be used, in which event the chains 26$^a$ and 27$^a$ are attached to opposite sides of the crank-sections 13 of the shifting bar 10 or fastened to opposite sides of a plain shifting rod by bolts, omitting the loop 12 and crank-sections 13, and are carried up through the guides or guards 23 over suitable rollers 24$^a$ or in engagement with the tongues 24.

The chains are connected with the brake-shoes 31 by rods 31$^a$, as shown in Fig. 8.

It may here be remarked that the recessed portions 25 of the tongues 24 receive the inner surfaces of the depressed parts 30 of the draft-rods 26 and 27. Where the brake-shoe is at each side of the car, the shifting bar is capable of sufficient lateral movement to render it self-adjusting or compensating to the variations in the arrangement of the brake shoes or blocks. The brake can be readily readjusted if the parts wear away sufficiently to render such adjustment necessary or desirable, and this is usually accomplished by lengthening or shortening the distance from the shifting bar to the top of the brake blocks or shoes by adding to the number or removing sundry of the washers 36 beneath the keys 38 on the upper ends of the draft-rods 26 and 27.

In the operation of the brake the lever 17 is grasped by the handle and pulled from right to left, which in turn rocks or rotates the shifting bar 10, and the rocking or rotating movement of the shifting bar causes the two draft-rods 26 and 27 to be drawn toward the center of the car. As the draft-rods move endwise toward the center of the car they cause the tongues 24 to rotate upon their axes in a downward direction, since they normally rest in the depressions 30 of the rods, and these depressions serve to prevent the tongues from dropping too far downward. This movement of the tongues 24 causes the outer ends of the draft-rods to move downward, and consequently impart a downward motion to the brake shoes or blocks 31, since the rods cannot be withdrawn from the brake blocks or shoes. The more nearly these tongues 24 assume a vertical position the greater will be the effect upon the brake shoes or blocks from a given or fixed power applied to the shifting lever 17. As the brake blocks or shoes move downward they compress the springs 37, and when the shifting lever 17 is released from the ratchet on the end of the car these springs expand and raise the brake-blocks 31, thus reversing the direction of motion of all the parts from the direction of motion when the brake was applied. The springs 37 hold the brake blocks or shoes free from the wheels and also hold all parts of the brake taut and the shifting lever 17 in position ready for the next application of the brake.

The apertures of the loop in the forward axle B and of the loop 15 are elongated, so that the end of the shifting bar 10 may move slightly sidewise, and thus apply an equal pressure to both brake-blocks. If these openings were of the same size as the shifting bar, thus preventing this sidewise movement, a rotation of the shifting bar would cease as soon as either block rested on the wheels with sufficient resistance to stop its rotation even if the other block were not touching the wheels on the other side of the car. The sliding motion obtained for the shifting bar by the peculiar construction of its bearings will permit the said shifting bar to continue rotating until both brake blocks or shoes exert equal pressure upon the wheels. So long as neither brake block nor shoe rests upon the wheels the center of rotation of the shifting bar 10 will be the center of said bar; but as soon as one brake block or shoe rests on the wheels its center of rotation is changed to one side of the opening 12 in the shifting bar or cranks 13 with which the draft-rods 26 and 27 are connected, and the shifting rod 10 itself moves sidewise until the brake block or shoe opposite rests on the wheel at its side of the car, and said shifting bar will continue to adjust itself until the pressure exerted by each of the two brake blocks or shoes is equal. This self-adjusting feature is of great advantage and renders the brake superior to others of its class.

Having thus described my invention, I claim as new and desire to secure by Letters Patent—

1. In a brake for cars and other vehicles, a shifting bar provided with a double crank and mounted to rock and have end play, an operating-lever connected with the shifting bar, spring-controlled brake shoes or blocks arranged for engagement with the upper surfaces of the wheels, draft-rods connected at one end with the shoes or blocks and at their other ends with the cranks of the shifting bar, and guides for the draft-rods, as set forth.

2. In a brake for cars and vehicles, the combination, with a shifting bar, bearings for the said bar, permitting rotary and lateral movement of the bar, and opposing crank-pins carried by said shifting bar, of brake shoes or blocks arranged for engagement with the outer portions of the wheels of the car or vehicle, draft-rods connected with the crank portions of the shifting bar and with the said brake shoes or blocks, and a directing mechanism engaging with said draft-rods at a point below the brake shoes or blocks, for the purpose specified.

3. In a brake for vehicles or cars, the combination with a shifting bar mounted to rotate and having limited lateral movement, and cranks carried by said shifting bar, of brake shoes or blocks adapted for engagement with the wheels of the vehicle or car, springs normally holding the said shoes or blocks out of engagement with said wheels, draft-rods attached to the brake shoes or blocks and to the cranks of the shifting bar, guards through which the said rods or chains pass, and tongues pivoted in the said guards in engagement with the said draft-rods, said tongues being arranged to impart vertical movement to the portions of the rods connected with said shoes or blocks, for the purpose specified.

CHARLES EDWARD SHARPLESS.

Witnesses:
SHERIDAN J. DALY,
N. C. PENTZ.